UNITED STATES PATENT OFFICE 2,375,301

PREPARATION OF ESTERS

Robert M. Joyce, Jr., Marshallton, Del., assignor to E. I. du Pont de Nemours & Company, Wilmington, Del., a corporation of Delaware No Drawing. Application May 22, 1942, Serial No. 444,113

14 Claims. (Cl. 260—493)

This invention relates to the preparation of esters and more particularly comprises a new process for the conversion of aliphatic halides, including cycloaliphatic and arylaliphatic halides, into esters of carboxylic acids.

The direct conversion of aliphatic, cycloaliphatic and arylaliphatic halides into esters of carboxylic acids has heretofore been possible only by the reaction of the halide with a salt of the desired acid. For example, it is known that the reaction of an alkyl iodide with the silver salt of an aliphatic acid gives rise to the corresponding aliphatic ester. Thallium salts of aliphatic acids likewise have been used in such a process. Alkali metal salts of aliphatic acids also have been employed for such reactions. For example, alkyl halides have been converted to the corresponding acetates by heating with anhydrous sodium or potassium acetate, preferably in acetic acid solution. These reactions are generally carried out in an anhydrous solvent, such as the free acid whose salt is being employed in the reaction.

All these prior processes suffer from the disadvantage that a solid reaction product, the inorganic metal halide, separates from the reaction mixture as the reaction proceeds. When the reaction is carried out on a large scale, the separation of this solid reaction product gives rise to serious manipulative problems and often renders difficult the attainment of high conversions.

This invention has as an object a process for the direct conversion of aliphatic halides, including cycloaliphatic and arylaliphatic halides, to esters of carboxylic acids. A further object is to provide a new process for the direct conversion of aliphatic halides, especially alkyl halides, to esters of carboxylic acids, and especially to esters of aliphatic carboxylic acids. Other objects will appear hereinafter.

These objects are accomplished by reacting an aliphatic, cycloaliphatic or arylaliphatic compound containing at least one isolated halogen atom with a carboxylic acid primary amide at a temperature in excess of 150° C. By "isolated halogen atom" is meant a halogen atom attached to a carbon atom which carbon atom is attached only to carbon or hydrogen atoms.

The preferred form of the invention is readily carried out by mixing an alkyl chloride, such as normal octyl chloride, with at least two and preferably 5 to 10 molecular equivalents of an aliphatic acid primary amide, such as formamide, and heating the mixture in the temperature range of 190°-250° C. for a few hours. A little anhydrous hydrogen chloride gas may be bubbled into the formamide prior to the beginning of the reaction in order to reduce the induction period often observed at the beginning of the reaction. However, this is not essential to a successful carrying out of the reaction. The resulting ester can be isolated by adding water to the reaction mixture and steam distilling, if the ester is volatile with steam, or by simple separation and subsequent purification by well known means.

This invention is further illustrated by the following examples in which the amounts are expressed in parts by weight.

*Example I*

A current of gaseous anhydrous hydrogen chloride is passed into 57 parts of formamide for 2 minutes. The current of hydrogen chloride is then discontinued, 18 parts of n-octyl chloride is added, and the mixture is refluxed for 7 hours. The reaction mixture is then cooled, diluted with water, and subjected to steam distillation. The steam-volatile fraction is separated from the water and purified by redistillation, and there is obtained 14 parts of pure n-octyl formate boiling at 73°/10 mm.

*Example II*

A mixture of 25 parts of n-octyl chloride with 83 parts of acetamide is refluxed under a condenser for 24 hours. The reaction mixture is then cooled, diluted with water, and subjected to steam distillation. The steam-volatile fraction is separated from the water, dried, and redistilled to obtain 17 parts of n-octyl acetate boiling at 81°–83°/7 mm.

*Example III*

A mixture of 21 parts of 1,1,1,5-tetrachloropentane with 57 parts of formamide is refluxed for 1.5 hours. The mixture is then cooled, diluted with water, and subjected to steam distillation. The steam-volatile product is separated from the water, dried, and redistilled to obtain 9.4 parts of the formate of 1,1-dichloropentene-1-ol-5, which is a liquid boiling at 87°/7.5 mm. and having a $n_D^{25}$ of 1.4723 and a $d_4^{25}$ of 1.2433.

The concurrent elimination of hydrogen chloride from the —$CH_2CCl_3$ group during this reaction is characteristic of the action of formamide on such a group, as set forth in my copending application, Serial No. 438,468, filed April 10, 1942.

Example IV

A mixture of 36 parts of n-heptyl bromide with 100 parts of formamide is refluxed. White crystals of ammonium formate appear in the condenser after about one-half hour of refluxing. The refluxing is continued for a total of 4 hours. The mixture is then cooled and the upper layer is separated and dissolved in an equal volume of anhydrous ether. A little anhydrous magnesium carbonate is added to facilitate the removal of the precipitated formamide. The solution is then filtered and distilled through a precision still. After removal of the ether and a small foreshot containing some formamide, most of the product distills at 82°–84° C./30 mm. There is thus obtained 18 parts of n-heptyl formate having a $$n\frac{24}{D}$$

of 1.4123.

The process of this invention is generally applicable to alkyl halides and more broadly to any aliphatic, cycloaliphatic or arylaliphatic halide which contains an isolated halogen atom. Among the aliphatic halides which may be used in this invention are ethyl chloride, butyl chloride, isobutyl chloride, the amyl chlorides, isooctyl chloride, lauryl chloride, ethylene dichloride and butylene dichlorides. Cycloaliphatic halides, such as cyclohexyl chloride, may also be used in this invention. Examples of arylaliphatic halides which may be used in accordance with the present invention are benzyl chloride, phenylethyl chloride and the naphthylmethyl chlorides. Although only aliphatic, cycloaliphatic and arylaliphatic chlorides have been specifically mentioned, it is to be understood that the corresponding bromides and iodides may also be used in this invention.

It is preferred to employ aliphatic, cycloaliphatic and arylaliphatic compounds bearing primary halogen, that is halogen attached to carbon which is attached to two hydrogen atoms. Such a halogen atom may be designated a primary isolated halogen atom. Alkyl halides bearing primary halogen are particularly preferred for use in this invention.

Other functional groups in addition to the isolated halogen atom can also be present in the compound to be reacted with the carboxylic acid primary amide. For example, there can be esterified by the process of this invention halogenated acids, such as chloroacetic and α-chloroisobutyric acids; halogenated ethers, such as β,β'-dichlorodiethyl ether; halogenated organic acid derivatives, such as chloroacetamide, chloroacetonitrile, ethyl chloroacetate and methyl 7-chloroheptanoate. The fact that in some instances the other functional group may be altered, such as the conversion of an ester group to an amide group, does not affect the operability of such compounds. However, when such reactions are anticipated, an additional quantity of primary acid amide should be employed in relation to the halogenated compound.

As esterifying agents for the organic halide, there may be employed any carboxylic acid primary amide. These include the primary acid amides of aliphatic carboxylic acids, such as formic, acetic, isobutyric, caproic, vinylacetic, crotonic, adipic and sebacic acids; the primary acid amides of carboxylic acids containing aromatic and hydroaromatic nuclei, such as benzoic, toluic, phenylacetic, naphthoic, naphthaleneacetic and hexahydrobenzoic acids; and the primary acid amides of carboxylic acids containing heterocyclic nuclei, such as furoic, nicotinic, picolinic, furylacrylic and indolebutyric acids. However, it is preferred to employ aliphatic carboxylic acid primary amides containing less than 7 carbon atoms. At least 2 and preferably 5 to 20 molecular equivalents of the amide based on the halide should be used.

In general, the reaction is conveniently operated at the reflux temperature of the amide being employed as a reactant. Should a low boiling alkyl halide be the other reaction component, it is advisable to employ superatmospheric pressure in order to raise the reaction temperature to the desired point. In general, a temperature between 100°–300° C. is desirable and the preferred temperature range is 170°–270° C.

As many apparently widely different embodiments of this invention may be made without departing from the spirit and scope thereof, it is to be understood that I do not limit myself to the specific embodiments thereof except as defined in the appended claims.

I claim:

1. A process for the direct conversion of aliphatic, cycloaliphatic and arylaliphatic halides to esters of carboxylic acids which comprises reacting a member of the group consisting of aliphatic, cycloaliphatic and arylaliphatic halides containing at least one primary isolated halogen atom with at least two molecular equivalents of a carboxylic acid primary amide at a temperature between 100°–300° C.

2. A process for the preparation of esters which comprises reacting a member of the group consisting of aliphatic, cycloaliphatic and arylaliphatic halides containing at least one primary isolated halogen atom with a carboxylic acid primary amide at a temperature between 100°–300° C. and subjecting the reaction mixture to steam distillation.

3. A process for the preparation of esters which comprises reacting an alkyl halide containing at least one primary isolated halogen atom with a carboxylic acid primary amide at a temperature between 170°–270° C. and subjecting the reaction mixture to steam distillation.

4. A process for the direct conversion of alkyl halides to esters of carboxylic acids which comprises reacting an alkyl halide containing at least one primary isolated halogen atom with at least two molecular equivalents of a carboxylic acid primary amide at a temperature between 170°–270° C.

5. A process for the direct conversion of aliphatic, cycloaliphatic and arylaliphatic halides to esters of carboxylic acids which comprises reacting at a temperature between 100°–300° C. a member of the group consisting of aliphatic, cycloaliphatic and arylaliphatic halides containing at least one primary isolated halogen atom with at least two molecular equivalents of an aliphatic carboxylic acid primary amide containing less than seven carbon atoms.

6. A process for the preparation of esters which comprises reacting at a temperature between 100°–300° C. a member of the group consisting of aliphatic, cycloaliphatic and arylaliphatic halides containing at least one primary isolated halogen atom with an aliphatic carboxylic acid primary amide containing less than seven carbon atoms and subjecting the reaction mixture to steam distillation.

7. A process for the direct conversion of alkyl halides to esters of carboxylic acids which comprises reacting at a temperature between 170°–270° C. an alkyl halide containing at least one primary isolated halogen atom with at least two molecular equivalents of an aliphatic carboxylic acid primary amide containing less than seven carbon atoms.

8. A process for the direct conversion of a normal alkyl chloride to a normal alkyl formate which comprises reacting said normal alkyl chloride with at least two molecular equivalents of formamide at a temperature between 170°–270° C.

9. A process for the direct conversion of a normal alkyl chloride to a normal alkyl acetate which comprises reacting said normal alkyl chloride with at least two molecular equivalents of acetamide at a temperature between 170°–270° C.

10. A process for the direct conversion of a normal alkyl bromide to esters of carboxylic acids which comprises reacting at a temperature between 170°–270° C. said normal alkyl bromide with at least two molecular equivalents of an aliphatic carboxylic acid primary amide.

11. A process for the direct conversion of amyl chlorides to esters of carboxylic acids which comprises reacting at a temperature between 170°–270° C. an amyl chloride containing at least one primary isolated chlorine atom with at least two molecular equivalents of a carboxylic acid primary amide.

12. A process for the preparation of esters which comprises reacting at a temperature between 170°–270° C. an amyl chloride containing at least one primary isolated chlorine atom with a carboxylic acid primary amide and subjecting the reaction mixture to steam distillation.

13. A process for the preparation of esters which comprises reacting a member of the group consisting of aliphatic, cycloaliphatic and arylaliphatic halides containing at least one primary isolated halogen atom with a carboxylic acid primary amide at a temperature between 100°–300° C.

14. A process for the preparation of esters which comprises reacting lauryl chloride with a carboxylic acid primary amide at a temperature between 100°–300° C.

ROBERT M. JOYCE, Jr.